United States Patent [19]

Bott

[11] Patent Number: 5,385,284
[45] Date of Patent: * Jan. 31, 1995

[54] VEHICLE ARTICLE CARRIER

[75] Inventor: John A. Bott, Grosse Pointe Shores, Mich.

[73] Assignee: JAC Products, Inc., Ann Arbor, Mich.

[ * ] Notice: The portion of the term of this patent subsequent to Oct. 31, 2006 has been disclaimed.

[21] Appl. No.: 990,552

[22] Filed: Dec. 14, 1992

Related U.S. Application Data

[63] Continuation of Ser. No. 905,307, Jun. 29, 1992, abandoned, which is a continuation of Ser. No. 592,606, Oct. 4, 1990, Pat. No. 5,158,425, which is a continuation of Ser. No. 407,635, Sep. 15, 1989, abandoned, which is a continuation of Ser. No. 213,899, Jun. 30, 1988, Pat. No. 4,877,168, which is a continuation of Ser. No. 3,134, Jan. 14, 1987, Pat. No. 4,754,905, which is a continuation of Ser. No. 778,385, Sep. 20, 1985, Pat. No. 4,684,048.

[51] Int. Cl.$^6$ .............................................. B60R 9/04
[52] U.S. Cl. ..................................... 224/321; 224/326
[58] Field of Search .......... 224/309, 321, 322, 324–327

[56] References Cited

U.S. PATENT DOCUMENTS

| Re. 26,538 | 3/1969 | Bott . |
| Re. 26,539 | 3/1969 | Bott . |
| Re. 32,583 | 1/1988 | Bott . |
| D. 314,541 | 2/1991 | Bott . |
| D. 317,744 | 6/1991 | Bott . |
| 2,242,844 | 5/1941 | Baier . |
| 2,388,625 | 11/1945 | Wagenknecht . |
| 2,910,895 | 11/1959 | Winslow . |
| 3,330,454 | 7/1967 | Bott . |
| 3,623,642 | 11/1971 | Stephen ............................ 224/326 |
| 3,643,973 | 2/1972 | Bott . |
| 4,015,760 | 4/1977 | Bott . |
| 4,099,658 | 7/1978 | Bott . |
| 4,106,680 | 8/1978 | Bott . |
| 4,132,335 | 1/1979 | Ingram . |
| 4,133,465 | 1/1979 | Bott . |
| 4,146,198 | 3/1979 | Bott . |
| 4,162,755 | 1/1979 | Bott . |
| 4,182,471 | 1/1980 | Bott . |
| 4,222,508 | 12/1980 | Bott . |
| 4,239,139 | 12/1980 | Bott . |
| 4,261,496 | 4/1981 | Mareydt et al. . |
| 4,264,025 | 4/1981 | Ferguson et al. ................... 224/321 |
| 4,270,681 | 6/1981 | Ingram . |
| 4,274,568 | 6/1981 | Bott . |
| 4,274,570 | 6/1981 | Bott . |
| 4,277,009 | 7/1981 | Bott . |
| 4,295,587 | 10/1981 | Bott . |
| 4,323,182 | 4/1982 | Bott . |
| 4,341,332 | 7/1982 | Kowalski et al. . |
| 4,364,500 | 12/1982 | Bott . |

(List continued on next page.)

FOREIGN PATENT DOCUMENTS 2832298  1/1980  Germany ............................ 224/316

Primary Examiner—J. Casimer Jacyna
Attorney, Agent, or Firm—Harness, Dickey & Pierce

[57] ABSTRACT

An article carrying system for operative association with an automotive vehicle having an exterior generally horizontal surface, such as a trunk lid or roof, the system comprising a pair of elongated support members or slats which have a configuration which flows conformably and aerodynamically into the surface of the vehicle and which are permenently secured to the vehicle. The support members have longitudinally extending channels for supporting adjustable and/or removable components of the system, including tie downs and cross members which components are also provided with aerodynamic designs compatible with the remainder of the system. Provision is also made for association of components of the system, such as cross members, to be fixedly located on the support members. An aerodynamic locking mechanism is also disclosed for use in selected adjustable and/or removable components of the system which includes a hidden actuation mechanism and a hooking action to lock the component to the support member or slat.

3 Claims, 4 Drawing Sheets

U.S. PATENT DOCUMENTS

| | | | |
|---|---|---|---|
| 4,406,386 | 9/1983 | Rasor et al. | 224/321 |
| 4,427,141 | 1/1984 | Bott . | |
| 4,431,123 | 2/1984 | Bott . | |
| 4,432,478 | 2/1984 | Bott . | |
| 4,433,804 | 2/1984 | Bott . | |
| 4,440,333 | 4/1984 | Bott . | |
| 4,442,961 | 4/1984 | Bott . | |
| 4,448,337 | 5/1984 | Cronce . | |
| 4,460,116 | 7/1984 | Bott . | |
| 4,469,261 | 9/1984 | Stapleton et al. | 224/321 |
| 4,473,178 | 9/1984 | Bott . | |
| 4,501,385 | 2/1985 | Bott . | |
| 4,516,709 | 5/1985 | Bott . | |
| 4,516,710 | 5/1985 | Bott . | |
| 4,684,048 | 8/1987 | Bott . | |
| 4,754,905 | 7/1988 | Bott . | |
| 4,768,691 | 9/1988 | Stapleton . | |
| 4,877,168 | 10/1989 | Bott . | |
| 4,899,917 | 2/1990 | Bott . | |
| 4,967,945 | 11/1990 | Bott . | |
| 4,972,983 | 11/1990 | Bott . | |
| 4,982,886 | 1/1991 | Cucheran . | |
| 5,082,158 | 1/1992 | Bott . | |
| 5,158,425 | 10/1992 | Bott | 224/321 |

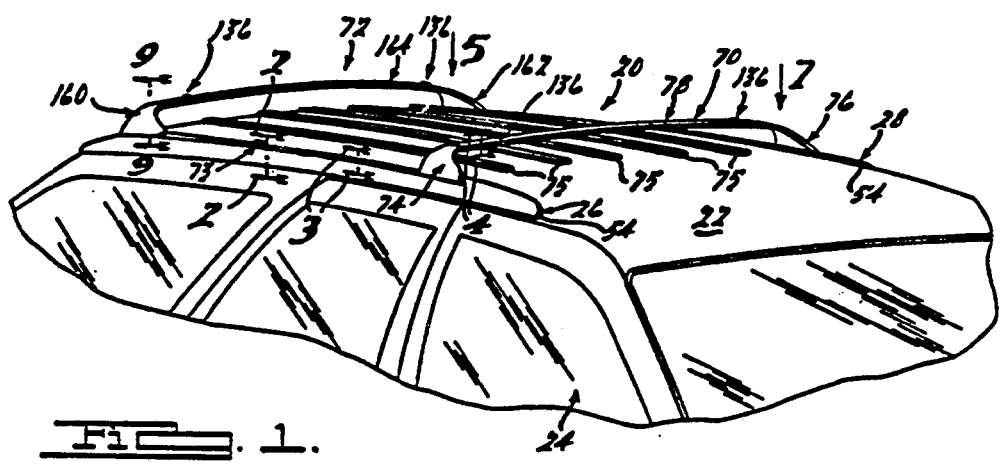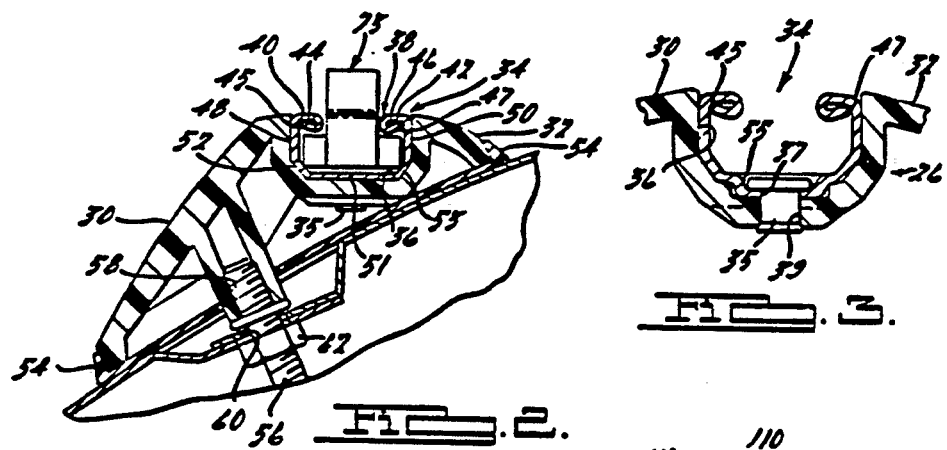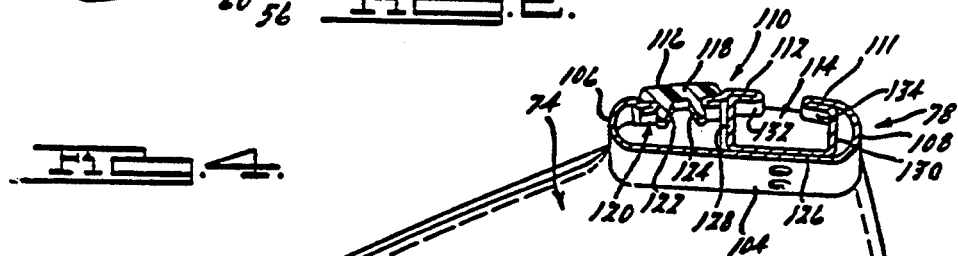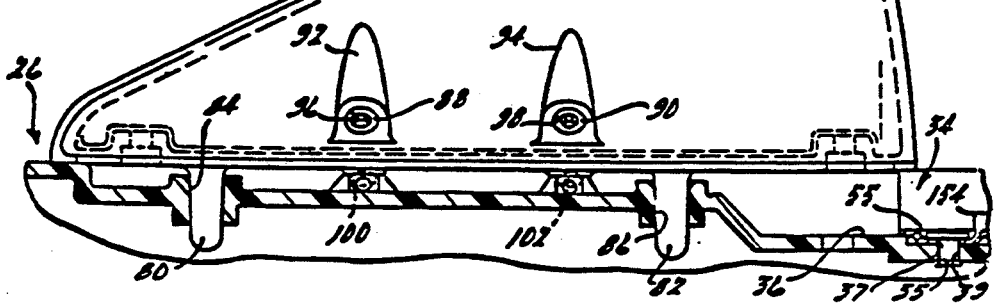

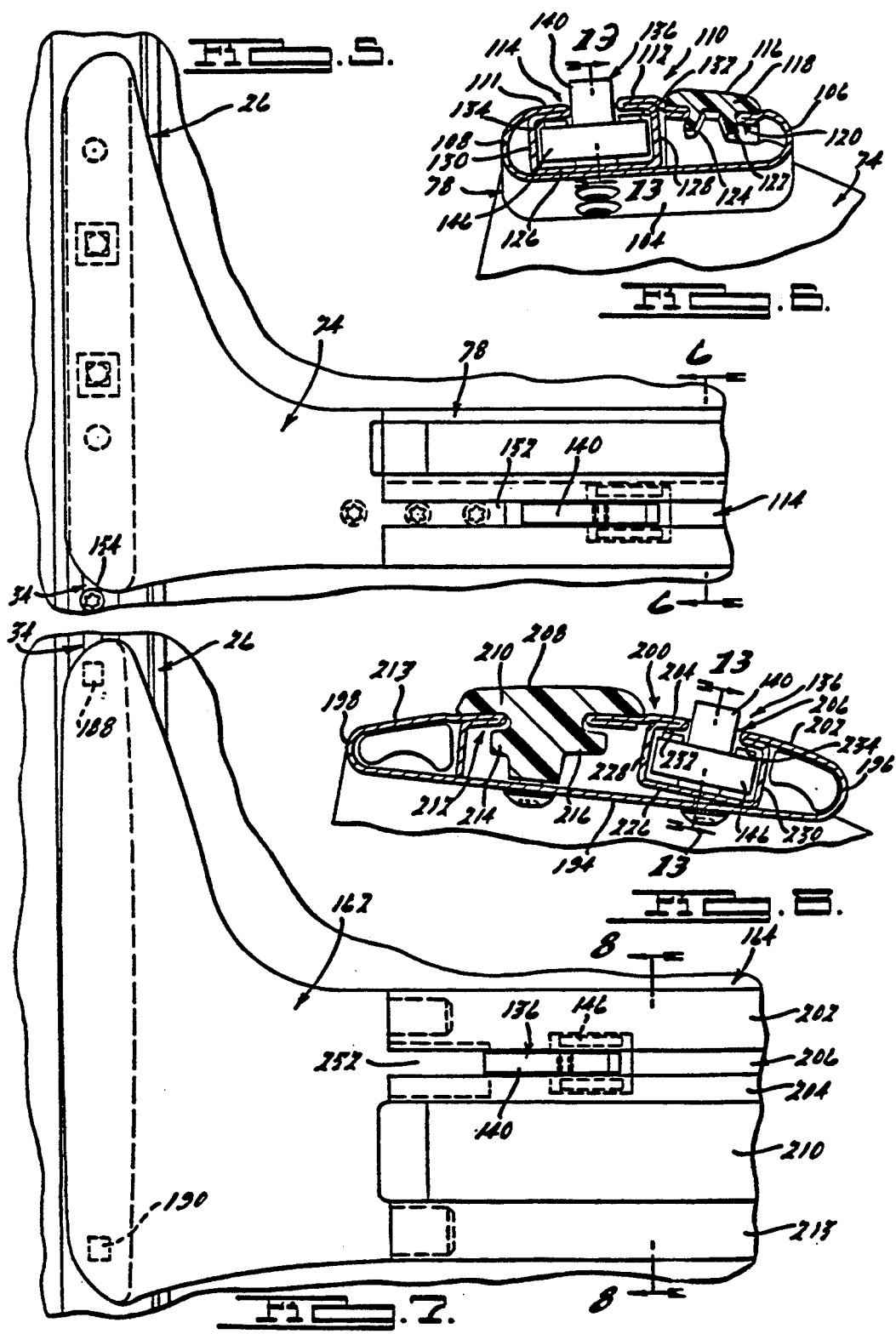

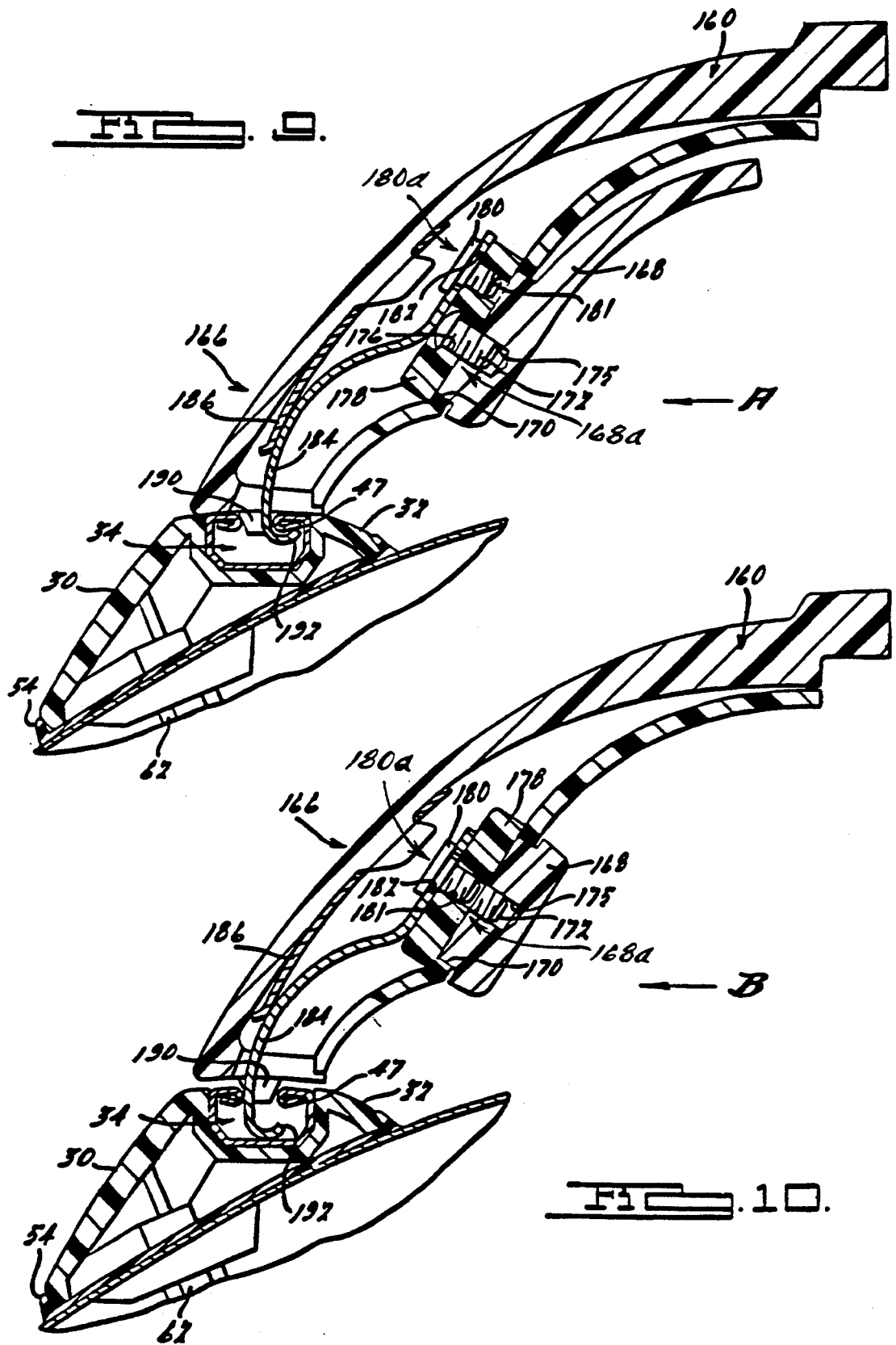

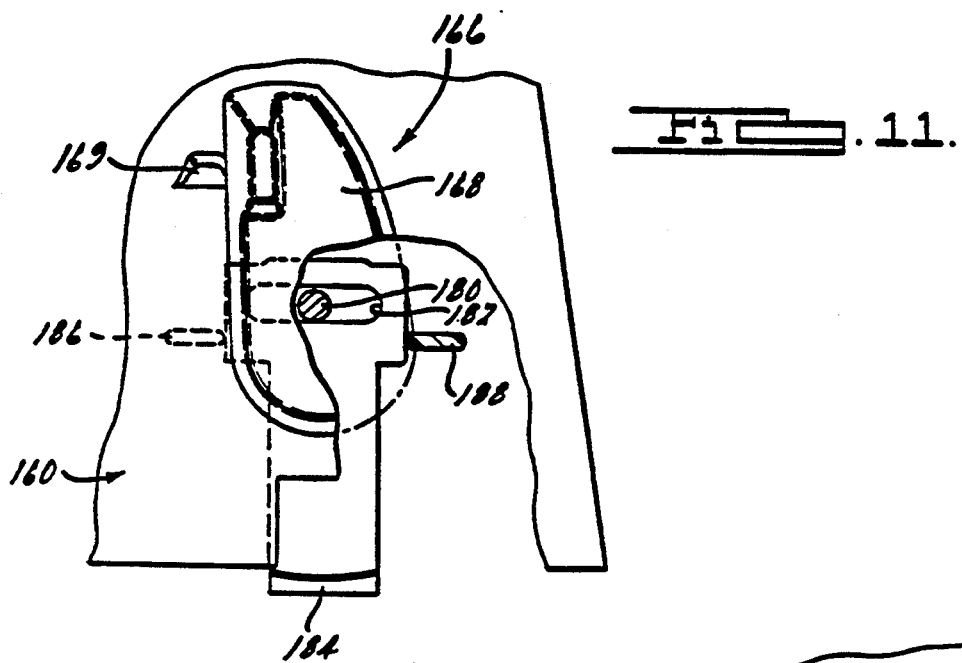
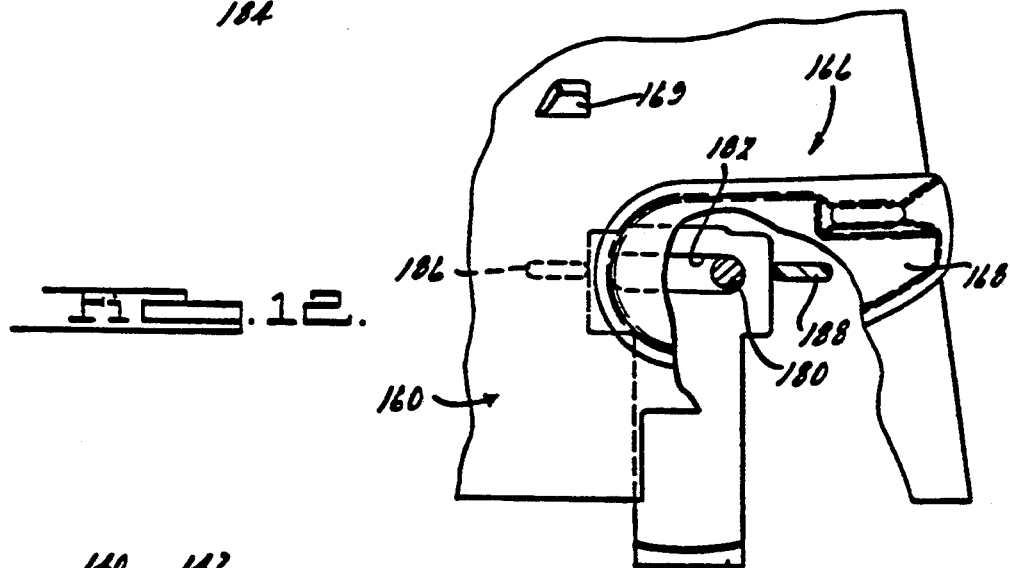
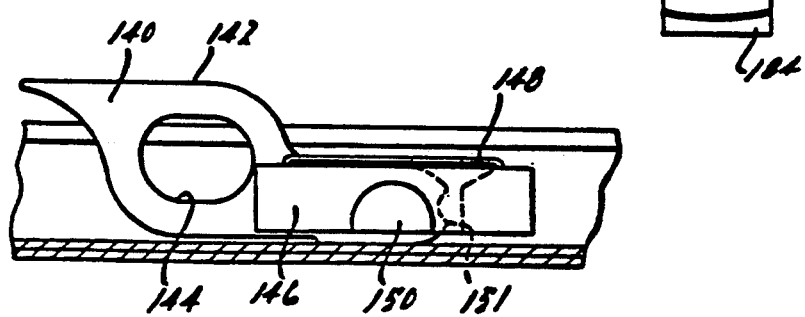

VEHICLE ARTICLE CARRIER

CROSS REFERENCE TO RELATED APPLICATIONS

This application is a continuation of U.S. application Ser. No. 07/905,307, filed Jun. 29, 1992, now abandoned, which is in turn a continuation of U.S. application Ser. No. 07/592,606, filed Oct. 4, 1990, now U.S. Pat. No. 5,158,425, which is in turn a continuation of U.S. application Ser. No. 07/407,635, filed Sept. 15, 1989, now abandoned, which is in turn a continuation of U.S. application Ser. No. 07/213,899, filed Jun. 30, 1988, now U.S. Pat. No. 4,877,168, which is in turn a continuation of 07/003,134, filed Jan. 14, 1987 now U.S. Pat. No. 4,754,905, which is in turn a continuation of U.S. application Ser. No. 06/778,385, filed Sept. 20, 1985, now U.S. Pat. No. 4,684,048.

BACKGROUND AND SUMMARY OF THE INVENTION

The present invention relates generally to vehicle article or luggage carriers and more particularly to a new and improved vehicle luggage carrier of the type shown in applicant's U.S. Pat. No. 4,099,658, issued Jul. 11, 1978. Generally, the article carrier of the present invention is of the type which comprises two or more slat-type elements which are fixedly secured to an exterior horizontal surface of an automotive vehicle, such as a vehicle roof or a trunk lid, and which are permanently attached to that surface and adapted to have ancillary article constraining members removably and/or adjustably secured thereto and includes a system of adjustable and fixed components which cooperate with one another and which may be removable in some instances.

The present invention has as one principle object to provide a luggage rack with slidably adjustable and fixedly engageable components including slidably adjustable cross members having tie downs for boxes, luggage, and the like associated with the cross members. The cross members and tie downs of the present invention are not only adjustable but also may be either removable from the luggage carrier or stored within other components of the luggage carrier substantially out of view. Each cross member may include at least one tie down and/or abutment member for optimum securement of articles or luggage to the article carrier and thereby the vehicle.

A significant advantage of the article carrier of the present invention is that the article carrier has a low profile when not in use with minimal structure projecting above the plane of the vehicle surface to which the article carrier is attached, thereby minimizing any adverse wind noise or fuel economy effects that would exist with any portion of the carrier being substantially vertically elevated.

The present invention further incorporates all of the aesthetically appealing features and the myriad of functional features and optional accessories disclosed in the slat-type luggage carriers of applicant's prior patents, such as that described in U.S. Pat. No. 4,099,658, referenced above.

Even more notably, the present invention elevates the aerodynamic design of a vehicle article carrier system having adjustable and/or removable components to an improved design not previously attained by any prior art carriers. The elongated support member or slat of the present invention providing the foundation of the carrier has surfaces which flow into and integrate with the surface of the vehicle, but also includes a channel along which components may be adjusted and/or removably attached.

In cooperation with this improved support member or slat, a new and improved locking mechanism for attaching the adjustable and/or removable components of the system to the member or slat is included having an aerodynamic, hidden release element.

Additional advantages are provided in the combination of the above features with other fixed components of an article carrier system and an improved cross member construction integrating adjustable tie down and/or abutment elements disposeable out of view, similar to those described in applicant's U.S. Pat. No. 4,460,116, issued Jul. 17, 1984, and further integrating a pad construction in a cross rail spaced from a functional channel on load bearing cross members for a more stable yet cushioned load bearing support for articles disposed on the cross members.

Other objects and advantages of the present invention will become apparent from the following detailed description taken in conjunction with the following drawings.

BRIEF DESCRIPTION OF THE DRAWINGS

FIG. 1 is a fragmentary perspective view of an automobile showing an article carrier mounted thereon which is constructed in accordance with the principles of the present invention;

FIG. 2 is an enlarged sectional view of the support member portion of the structure illustrated in FIG. 1 taken along the line 2—2 thereof;

FIG. 3 is an enlarged sectional view of the support member portion of the structure illustrated in FIG. 1 taken along the line 3—3 thereof;

FIG. 4 is an enlarged sectional view of one of the front stanchion portions of the structure of FIG. 1 taken along the line 4—4 thereof;

FIG. 5 is an elevated enlarged fragmentary view of one of the front stanchion assemblies of FIG. 1 taken in the direction of arrow 5.

FIG. 6 is a cross-sectional view of the cross rail portion of FIG. 5 taken along the line 6—6 of FIG. 5;

FIG. 7 is an elevated enlarged fragmentary view of one of the rear stanchion portions of the structure of FIG. 1 taken in the direction of arrow 7;

FIG. 8 is a cross-sectional view of the cross rail portion of FIG. 7 taken along the line 8—8 of FIG. 7;

FIG. 9 is a cross-sectional view of the rear stanchion of FIG. 7 locked to the base support member or slat of FIG. 1;

FIG. 10 is a cross-sectional view similar to FIG. 9 of the rear stanchion of FIG. 7 released from the base support member or slat of FIG. 1;

FIG. 11 is a view similar to FIG. 4 of the rear stanchion of FIG. 9 looking in the direction of arrow A in FIG. 9 having portions broken away;

FIG. 12 is a view similar to FIG. 11 of the rear stanchion of FIG. 10 looking in the direction of arrow B in FIG. 10 having portions broken away;

FIG. 13 is a vertical sectional view of either FIGS. 6 or 8 along the line 13—13 of either view of the tie down disposed in the cross rail of either view; and

DETAILED DESCRIPTION OF THE PREFERRED EMBODIMENTS

Referring now in detail to FIG. 1 of the drawings, a vehicle luggage carrier 20 is shown in operative association with a generally horizontally disposed roof 22 of a typical automotive vehicle 24. Generally speaking, the luggage carrier 20 comprises a pair of laterally spaced, longitudinally extending support members or slats 26 and 28 which are secured upon the roof 22 at positions adjacent the lateral sides or edges thereof. In the embodiment illustrated, the members 26 and 28 are disposed over the seam where the roof 22 meets the remainder of the body portion of the vehicle, where the roof 22 has a downward curvature, which places the members 26 and 28 adjacent the horizontally extending surface portion of the roof 22. The members 26 and 28 have an external surface configuration that flows aerodynamically and smoothly in the surface of the vehicle 24.

Intermediate portions of the member 26 (or 28) are illustrated in cross-section in FIGS. 2 and 3. The member 26 comprises first 30 and second 32 exterior surfaces having an elongated channel 34 between the surfaces. The channel 34 comprises an elongated recess 36 and a liner 38 disposed in said recess 36 by means of, with reference to FIG. 3, fasteners 35 set through bores 37 in the liner and bores 39 in the recess 36. The liner 38 has upper article supporting surfaces 40, 42 disposed on a pair of inwardly directed upper flanges 44, 46, a pair of sidewalls 48, 50 extending downwardly therefrom, and a base 51 extending between the walls 48, 50 and integrated with the walls 48 and 50 via walls 52 and 53, respectively. The upper flanges 44, 46 are rolled back as illustrated in FIGS. 2 and 3 to provide grooves 45 and 47 in the interior of the channel 34 for the purposes as will be described below. The fasteners 35 are set below the surface of the base 51 by placement in recesses 55, as shown in FIGS. 3 and 4.

Referring to FIG. 2, a pad 54 is disposed between each of the members 26 and 28 and the roof 22. Each member 26 or 28 is secured to the roof 22 by a plurality of threaded collar studs 56 threadably engaged to the member 26 or 28 within a bore 58 and engaged with the roof 22 at the interior of the roof 22 through a plurality of holes 60 in the roof by means of a plurality of nuts 62. The studs 56 engage the members 26 and 28 at the plurality of bores 58 by augering into the members 26 and 28, which are plastic in the preferred embodiment, or by other conventional means. In this manner, the studs 56 are all hidden from view when the members 26 and 28 are assembled on the vehicle.

The article carrier 20 of FIG. 1 further comprises a pair of transversely or laterally extending cross member assemblies 70 and 72 and may also include a tie down 73 and a plurality of intermediate supporting slats 75. The front cross member assembly 70 comprises a pair of stanchions 74 and 76 telescopically engaged with and secured to a front cross rail 78. Referring to FIG. 4, the stanchion 74 (and likewise 76) is fixedly secured to the support member 26 (and 28) via two posts 80 and 82 which fit into two bores 84 and 86 at the front portion of each of the members 26 and 28 and via two bolts 88 and 90 fitting through recesses 92 and 94 and apertures 96 and 98 in each of the stanchions 74 and 76 into corresponding threaded bores 100 and 102 in the members 26 and 28.

The stanchions 74 and 76 have an aerodynamically streamlined curvature as illustrated in FIGS. 1, 4, and 5 and telescopically engage the front cross rail 78 in a similarly aerodynamically streamlined manner. Referring to FIGS. 4 and 6, the cross rail 78 comprises a bottom surface 104 from which a curved leading surface 106 and a curved trailing surface 108 extend upwardly. The upper surface 110 of the cross rail 78 comprises a series of elongated article supporting surfaces including surfaces 111 and 112 disposed one on each side of an elongated first channel 114 and a surface 116 disposed on an elongated front bumper 118 set into a second channel 120 in the rail 78. The bumper 118 has a pair of elongated flanges 122 and 124 on the underside thereof to secure the bumper in the second channel 120.

Referring to FIGS. 4 and 6, the first channel 114 has an interior cross-section having a base 126, a pair of sidewalls 128 and 130, and a pair of interior clamping surfaces 132 and 134. Within the first channel 114 (FIG. 6) is disposed a tie down/positioning member 136 similar to that disclosed in applicant's U.S. Pat. No. 4,460,116, issued Jul. 17, 1984. The tie down/positioning member 136 (FIGS. 6 and 13) is comprised of an upper section 140 having a vertically disposeable abutment surface 142 and an aperture 144 therein, a base portion 146 including spring biasing members 148, and a pivot 150 for pivotably associating the upper section 140 with the base portion 146. The upper section 140 also includes a lower cam member 151 on the opposite side of the pivot 150 which engages the base 126 of the first channel 114 with pivotal movement of the upper section 140 from the horizontal to the vertical and clamp the biasing members 148 against the clamping surfaces 132 and 134 and lock the tie down/positioning member 136 in any selected position along the length of the first channel 114. The ends of the channel 114 also include an abutment 152 (FIG. 5) to aid in disposing the upper section 140 from the horizontal to the vertical.

The rear cross member assembly 72 is adjustable to any selected position along the length of the members 26 and 28, as determined by a stop 154 (FIGS. 4 and 5) or by the end of the channel 34, and may also be removed, if desired. The assembly 72 (FIGS. 1 and 7) comprises a pair of stanchions 160 and 162 telescopically engaged with and secured to a rear cross rail 164. The stanchions 160 and 162 each engage a corresponding support member 26 or 28 at the channel 34 thereof via a locking mechanism 166 (FIGS. 9 through 12). The locking mechanism 166 comprises a pivoted lever 168 mounted to each stanchion 160 or 162 at a first pivot point 168a. The lever 168 is mounted within a recess 170 and secured to a pin 172. The lever 168 is limited in movement by a stop 169 (FIG. 11) to indicate a vertically disposed position for the lever 168. The pin 172 threadably engages the lever 168 in a bore 175 and communicates with the interior 174 of the stanchion and engages an intermediate coupling element in the form of an eccentric member 178. The eccentric member 178 is disposed in the stanchion interior 174 via a bore 176 at a position offset from the center of the member 178 to eccentrically move a pin 180 mounted on the member 178 at bore 181 at a second pivot point 180a. Referring to FIGS. 11 and 12, the pin 180 moves within a yoke 182 which is integrated with a hook 184. Guides 186 and 188 may be disposed one on each side of the yoke 182 to stabilize the linear vertical movement of the hook 184. The hook 184 is formed with a curvature to permit some resiliency. Further tension is applied to the hook 184 by a tensioning member 186 fixedly disposed adjacent the path of movement of the hook 184 as illustrated in FIGS. 9 and 10.

In operation, the stanchion 160 or 162 is placed over the channel 34 of the support member or slat 26 and the hook 184 is placed within the channel 34. The stanchion 160 or 162 also includes front and rear guide portions in the form of alignment posts 188 and 190 (FIG. 7) which are also placed within the channel 34 as the stanchion is set upon the upper surfaces 40 and 42 of the member 26 or 28. Once alignment is attained, the lever 168 is rotated pivotally at the first pivot point 168a from a horizontally disposed position (FIG. 10) to a vertically disposed position (FIG. 9) abutting against the stop 169. This simultaneously causes the member 178 to move pivotally relative to the hook 184 at the second pivot point 180a, thus lifting the hook 184 so that its leading edge 192 is engaged with the groove 47 of the channel 34 to clamp the stanchion 160 or 162 to the support member or slat 26. The return of the lever 168 to a horizontal disposition releases the hook 184 and the stanchion 160 or 162 from the member or slat 26 for adjustment or removal.

Referring to FIGS. 7 and 8, the rear cross rail 164 is similar to the front cross rail 78 in that it has a bottom surface 194 from which a curved leading surface 196 and a curved trailing surface 198 extend upwardly. It should be noted that the leading surface 196 and trailing surface 198 may be reversed, however, depending upon the selected placement of the rear cross rail assembly 72 on the members 26 and 28. The upper surface 200 of the cross rail 164 comprises a series of elongated article supporting surfaces including surfaces 202 and 204 disposed one on each side of an elongated first channel 206, a surface 208 disposed on an elongated front bumper 210 set into a second channel 212 in the rail 78 and an additional surface 213. The bumper 210 has a pair of elongated flanges 214 and 216 on the underside thereof to secure the bumper in the second channel 212.

Referring to FIG. 8, the first channel 212 has an interior cross-section having a base 226, a pair of sidewalls 228 and 230, and a pair of clamping surfaces 232 and 234. Within the first channel 212 is disposed a tie down/positioning member 136 again similar to that disclosed in applicant's U.S. Pat. No. 4,460,116, issued Jul. 17, 1984. The tie down/positioning member 136 is again comprised of an upper section 140 having a vertically disposeable abutment surface 142 and an aperture 144 therein, a base portion 146 including spring biasing members 148, and a pivot 150 for pivotally associating the upper section 140 with the base portion 146. The upper section 140 also includes a lower cam member on the opposite side of the pivot 150 which engages the base 226 of the first channel 212 with pivotal movement of the upper section 140 from the horizontal to the vertical and clamp the biasing members 148 against the clamping surfaces 232 and 234 and lock the tie down/positioning member 136 in any selected position along the length of the first channel 212. The ends of the channel 212 also include an abutment 252 (FIG. 7) to aid in disposing the upper section 140 from the horizontal to the vertical.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

I claim:
1. An article carrier adapted to be secured to a motor vehicle adjacent a generally horizontally extending outer body surface on the vehicle, comprising:

a pair of elongated support members adapted to be secured to the vehicle surface, each said support member having a bottom portion adapted to be disposed in generally facing relation toward the vehicle body outer surface and to rest generally flush against said surface, and an upper and outer side portion curving gradually upwardly and inwardly in diverging relation to said bottom portion and in converging relation to each other, an inner side portion, a locking portion extending outwardly adjacent said inner side portion and an elongated, generally vertically oriented channel extending longitudinally along said support member, said support member having a longitudinal centerline and said channel being offset from said longitudinal centerline of said support member;

at least one cross member having two opposing end portions and disposed generally perpendicularly between said support members and extending above and generally parallel to said outer body surface of said vehicle; and a pair of locking members secured to said opposing end portions of said cross member and disposed one on each said support member for locking said cross member at a selected position along each said support member;

each said locking member including:
  a generally linearly extendable and retractable locking element projecting into engagement with its associated locking portion and engageable with its associated locking portion for releasably securing said cross member at a selected position along its associated support member;
  an actuating element for urging said locking element generally linearly towards and away from said locking portion such that said locking element cooperates with said locking portion to thereby secure said cross member at said selected position;
  an intermediate coupling element for coupling said actuating element with said locking element, said intermediate coupling element being operable to enable said locking element to be moved between locked and unlocked positions relative to said locking portion in response to manual movement of said actuating element;
  said actuating element being associated at a first point with said intermediate coupling element and with a housing of said locking means;
  said intermediate coupling element being pivotally associated at a second point spaced apart from said first point with said locking element such that manual movement of said actuating element relative to said housing of said locking member causes said intermediate coupling element to urge said locking element generally linearly towards and away from said locking portion; and
  a guide portion which protrudes at least partially into said channel when said locking member is disposed on said support member to guide said locking member and said cross member longitudinally along said support member when longitudinally positioning said cross member and without first removing each said locking member from its associated support member.

2. An article carrier system adapted to be secured to a motor vehicle adjacent a generally horizontally extending outer body surface on said vehicle, comprising:
 a cross member;
 a bracket member disposed at each end of said cross member;
 a pair of elongated support members adapted to be secured to said outer body vehicle surface, said support members each including:
  a bottom portion adapted to be disposed in generally facing relation toward said outer body vehicle surface and to rest generally flush against said outer body vehicle surface;
  an upper and outer side portion curving gradually upwardly and inwardly in diverging relation to said bottom portion;
  an inside portion;
  an elongated channel opening generally vertically and extending longitudinally along each of said support members, said support member having a longitudinal centerline and said channel being offset from said longitudinal centerline of said support member; and
  a locking portion extending longitudinally with said support member; each said bracket member including:
 a locking element for releasably locking said cross member in a selected position on its associated said support member;
 a housing having a lower surface adapted to be disposed in facing relationship to a portion of said support member when said bracket member is positioned on its associated support member;
 an outside surface and an inside surface spaced transversely from said outside surface by said lower surface;
 a manually moveable actuating member associated with said housing at a first point and movable pivotally relative to said housing;
 an intermediate coupling element for operationally coupling with said actuating member at said first point and pivotally associated with said locking element at a second point spaced apart from said first point, said intermediate coupling element being operable to transform pivotal movement of said actuating member relative to said housing into generally linear movement of said locking element, such that when said actuating element is moved between locked and unlocked positions said locking element is urged generally linearly into and out of locking engagement with said support member;
 a guide portion protruding at least partially into said channel when said bracket member is both lockably and unlockably engaged with its associated support member, to thereby help guide said bracket member along said associated support member during longitudinal positioning of said associated support member; and
 said bracket member further being removable from its associated said support member without disassembly of said bracket member or its associated said support member.

3. An article carrier adapted to be secured to a motor vehicle adjacent a generally horizontally extending outer body surface on the vehicle, comprising:
 a pair of elongated support members adapted to be secured to the outer body vehicle surface, each said support member having a bottom portion adapted to be disposed in generally facing relation toward said vehicle body surface and to rest generally flush against said vehicle body surface, and an upper and outer side portion curving gradually upwardly and inwardly in diverging relation to said bottom portion and in converging relation to each other, each said support member further having an inner side portion with a locking portion extending adjacent said inner side portion, and an elongated, generally vertically opening channel extending longitudinally on each of said support members, said support member having a longitudinal centerline and said channel being offset from said longitudinal centerline of said support member;
 at least one cross member having two opposing end portions and disposed generally perpendicularly between said support members and extending elevationally above and generally parallel to said body surface of said vehicle; and
 locking members secured to each of said opposing end portions of said cross member and disposed on said support members for locking said cross member at a selected position along each said support member, each said locking member including:
  a housing with an outside surface and an inside surface, and a first end portion mounted to one end of said cross member and a second end portion releasably engageable with a corresponding one of said locking portions;
  a generally linearly extendable and retractable locking element moveable into engagement with its associated support member and engageable with said support member for releasably securing said cross member at a selected position along said support member;
  an actuating member operably associated with said housing at a first point for urging said locking element into and out of locking engagement with its associated support member, said actuating member including:
   an intermediate coupling element for coupling with said actuating member at said first point and pivotally associated with said locking element at a second point spaced apart from said first point, and for translating manual rotational movement of said actuating member into generally linear movement of said locking element;
   said coupling element enabling said locking element to be drawn generally linearly out of locking engagement with said locking portion when said actuating member is rotated in a first rotational direction, and into locking engagement with said locking portion when said actuating member is rotated in a second direction opposite to said first direction; and
  said locking member further including a guide member protruding at least partially into said channel when said locking member is disposed on said support member to enable said locking member and said cross member to be slidably, longitudinally positioned along said support member without first removing said locking member from said support member.

* * * * *